(12) United States Patent
Kayanuma

(10) Patent No.: US 8,310,905 B2
(45) Date of Patent: Nov. 13, 2012

(54) WOBBLE SIGNAL EXTRACTING CIRCUIT, METHOD FOR EXTRACTING WOBBLE SIGNAL, AND OPTICAL DISK UNIT

(75) Inventor: Kinji Kayanuma, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/232,683

(22) Filed: Sep. 14, 2011

(65) Prior Publication Data

US 2012/0087219 A1 Apr. 12, 2012

(30) Foreign Application Priority Data

Oct. 6, 2010 (JP) ................................. 2010-226927

(51) Int. Cl.
*G11B 15/52* (2006.01)
(52) U.S. Cl. .................... 369/47.17; 369/53.33
(58) Field of Classification Search .......................... None
See application file for complete search history.

(56) References Cited

U.S. PATENT DOCUMENTS 7,177,244 B2 2/2007 Hashimoto
7,933,173 B2 4/2011 Senba
2005/0147016 A1 7/2005 Morikawa et al.
2006/0215510 A1 9/2006 Hashimoto
2009/0154305 A1 6/2009 Senba

FOREIGN PATENT DOCUMENTS

| JP | 2005-196846 | 7/2005 |
| JP | 2009-146502 | 7/2009 |
| WO | WO2005/015548 | 2/2005 |

*Primary Examiner* — Paul Huber
(74) *Attorney, Agent, or Firm* — Young & Thompson

(57) ABSTRACT

A wobble signal extracting circuit includes: a readout signal generating circuit generating an RF signal by adding first and second detection signals corresponding to reflected light from inside and outside a recording track; a first subtractor generating a push-pull signal by subtracting the first and second detection signals, respectively; a first analog-to-digital converter (ADC) converting the RF signal to digital; a second ADC converting the push-pull signal to digital; a residual RF component generating circuit generating a residual RF signal component equivalent to the RF signal component remaining in the digitized push-pull signal; and a second subtractor generating the wobble signal by subtracting the residual RF signal component from the digitized push-pull signal. The residual RF component generating circuit generates the residual RF signal component so that it may approach the remaining RF signal component based on correlation between the wobble signal and the digitized RF signal.

11 Claims, 7 Drawing Sheets

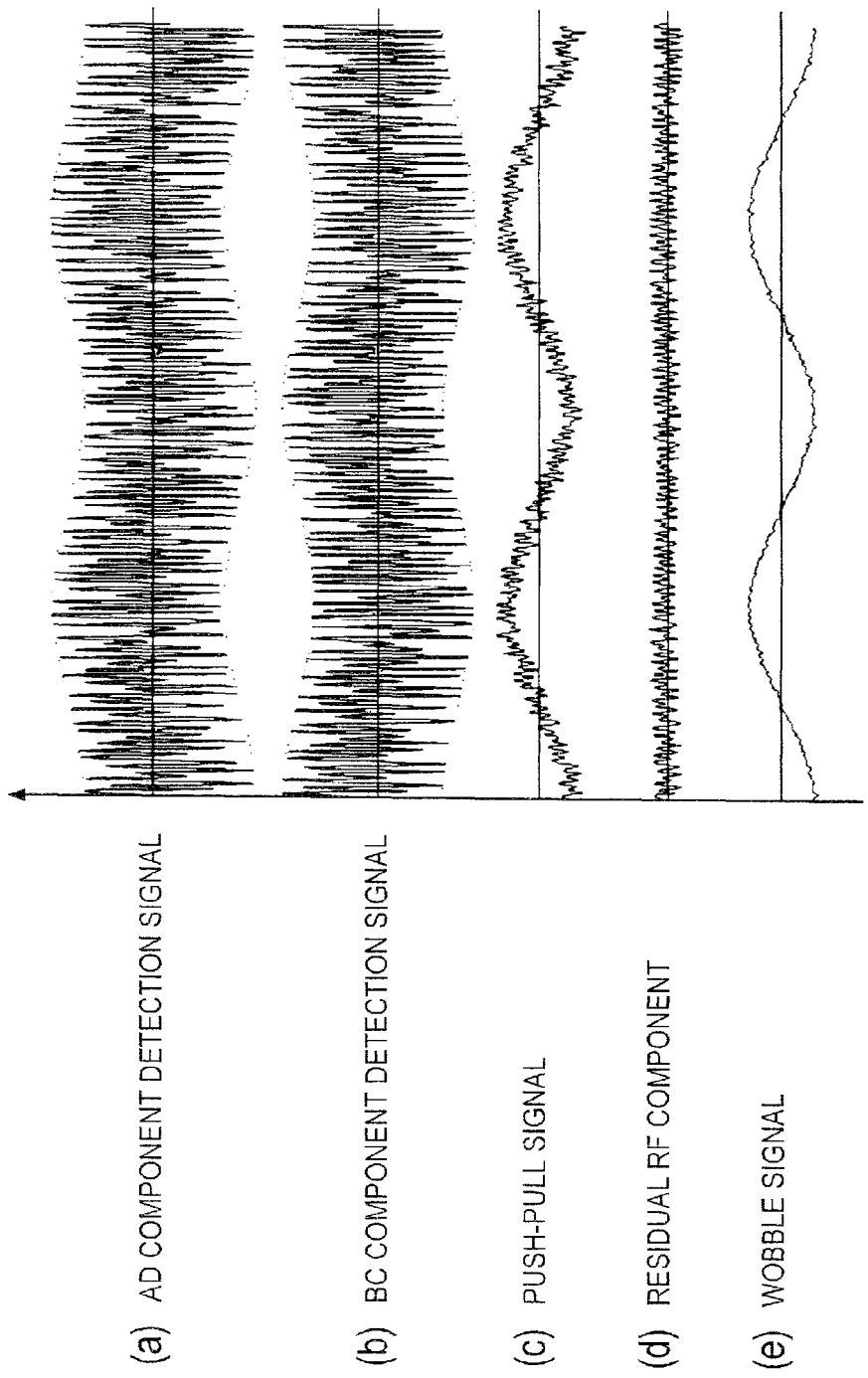

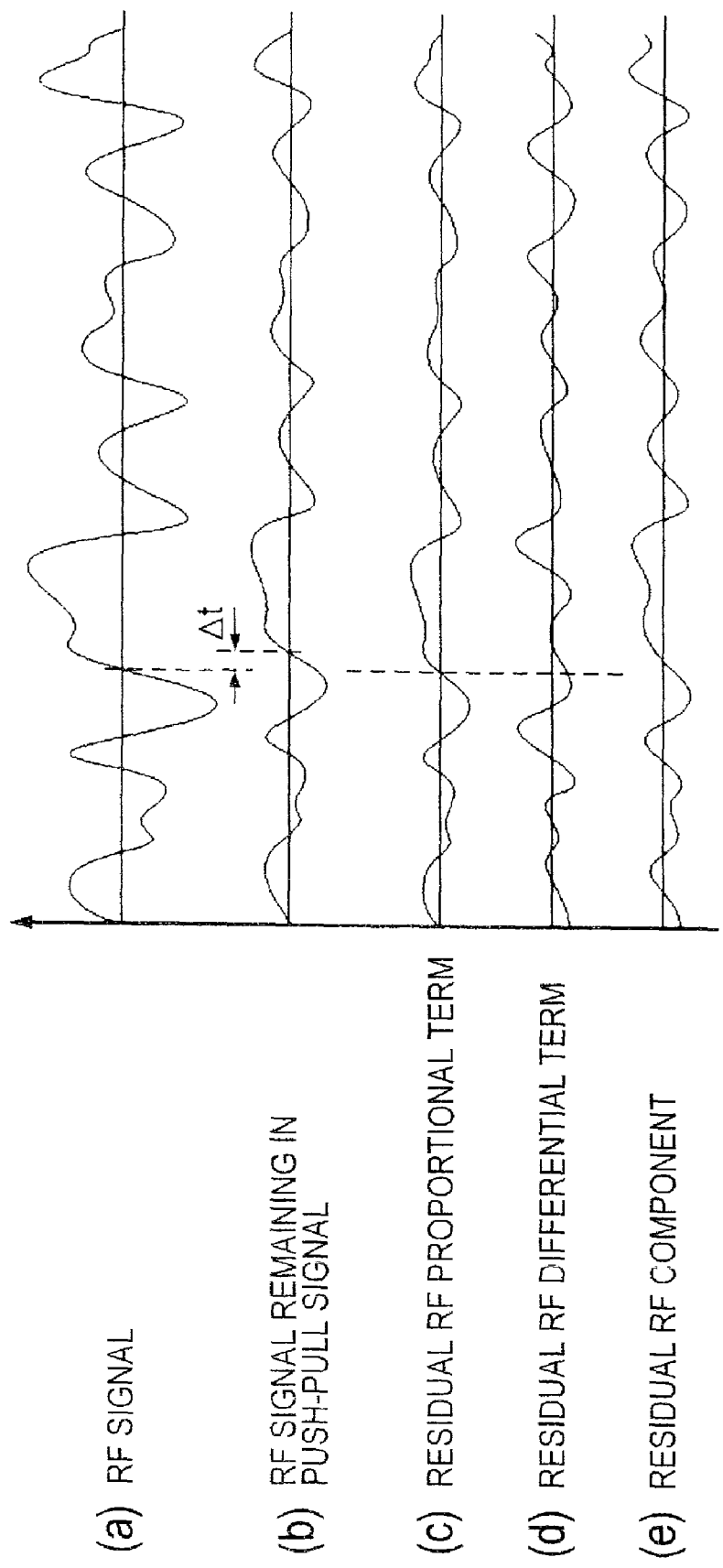

WITH USE OF ONLY RESIDUAL RF PROPORTIONAL TERM

WITH USE OF RESIDUAL RF PROPORTIONAL TERM
AND RESIDUAL RF DIFFERENTIAL TERM

WOBBLE SIGNAL EXTRACTING CIRCUIT, METHOD FOR EXTRACTING WOBBLE SIGNAL, AND OPTICAL DISK UNIT

CROSS-REFERENCE TO RELATED APPLICATIONS

The disclosure of Japanese Patent Application No. 2010-226927 filed on Oct. 6, 2010 including the specification, drawings and abstract is incorporated herein by reference in its entirety.

BACKGROUND

The present invention relates to a technology of recording and reproducing information, and especially to, a wobble signal extracting circuit for extracting a wobble signal from an optical disk correctly.

Generally, on the optical disk for recording, a guide groove that indicates a scanning direction of a light beam is formed in a meandering manner. The meandering guide groove is called a wobble. If recording marks are formed on the optical disk based on a recording clock in sync with a meandering frequency of this wobble, an optical disk unit can record information with a predetermined recording density. The relationship between the meandering frequency of the wobble and the recording clock is defined by a standard specification of the optical disk. For example, in DVD-R/RW (Digital Versatile Disk-R/RW), the meandering frequency of the wobble is determined to be 140.65 kHz equivalent to $1/186$ times the reference frequency of 26.16 MHz of the recording clock. In DVD+R/RW (Digital Versatile Disk+R/RW), the meandering frequency is 817.5 kHz equivalent to $1/32$ times the recording clock.

Moreover, there is a case where modulation indicating position information may be added to the wobble. For example, in DVD+R/RW, the position information is embedded by making a part of the wobble meander in a reverse phase. In CD-R/RW, FM modulation that uses the position information is applied to the wobble frequency itself. Incidentally, in DVD-R/RW, the position information is indicated by pits (land prepits) formed on land adjacent to the guide groove without modulating the wobble.

The optical disk unit determines data recording positions to the optical disk based on the position information being read from the modulated wobble and land prepits and the recording clock in sync with the meandering frequency. In order that a photo detector of the optical disk unit detects the wobble signal indicating the meandering of the wobble, it is equipped with at least two divided light receiving parts along a tangential direction of the guide groove. When the divided light receiving parts detect reflected light rays from the guide groove, the wobble signals are outputted from an inner circumferential side light receiving part and an outer circumferential side light receiving part as mutually reverse phase signals. Therefore, by finding a difference between the signals (a push-pull signal) outputted from the respective light receiving parts on the inside and the outside, the optical disk unit can acquire the wobble signal.

However, an output signal of each light receiving part corresponding to an area where the recording marks were formed is such that a signal of brightness/darkness according to existence/absence of the recording mark (an RF signal) is superposed on the wobble signal. Since this RF signal component is added to the each light receiving part on the inside and the outside in phase, ideally it can be removed by taking a difference between signals outputted from respective light receiving parts on the inside and the outside. However, due to factors of distortion of the optical beam shape focused on the optical disk and a gap between the recording mark and a center of the guide groove, etc., the signal strengths obtained from the respective light receiving parts on the inside and the outside make a difference. Generally, since the strength of the RF signal component is larger than the strength of the signal component accompanying the meandering of the wobble by about one order, even if there is a slight unbalance in output amplitude of the light receiving part, it is often the case where the magnitude of the remaining RF signal component easily becomes a magnitude that cannot be ignored. If the RF signal component remaining in the push-pull signal is large, there is a problem that it becomes difficult to detect the position information being based on the wobble.

As a technology about extraction of the wobble signal, Japanese Unexamined Patent Publication No. 2009-146502 and Japanese Unexamined Patent Publication No. 2005-196846 are disclosed.

Japanese Unexamined Patent Publication No. 2009-146502 discloses a wobble signal extracting circuit that can remove an RF component certainly from the wobble signal with a simple configuration. The wobble signal extracting circuit of Japanese Unexamined Patent Publication No. 2009-146502 has: an adder for acquiring an RF signal component by adding an A+D signal and a B+C signal each of which were detected from the two light receiving parts having been divided into two, respectively; a subtractor for acquiring the wobble signal by subtracting the B+C signal from the A+D signal; a latch comparator for binarizing the RF signal component; a latch comparator for binarizing the wobble signal; and an EXOR circuit for calculating exclusive OR of the binarized RF signal component and the wobble signal. Then, the wobble signal extracting circuit detects an amplitude balance of the A+D signal and the B+C signal based on an operation result of exclusive OR. The wobble signal extracting circuit of Japanese Unexamined Patent Publication No. 2009-146502 makes it possible to make uniform the amplitude balance of the A+D signal and the B+C signal, and makes it possible to extract the wobble signal with high precision.

Japanese Unexamined Patent Publication No. 2005-196846 discloses the wobble signal extracting circuit that removes the RF signal component included in the wobble signal without providing a high-precision band pass filter. This wobble signal extracting circuit has: a first gain amplifier for giving a gain to a first optical disk signal that includes the wobble signal component arising from the wobble formed on the surface of the optical disk and a RF signal component based on recording or reading of data; a second gain amplifier for giving a gain to a second optical disk signal that includes the wobble signal in a reverse phase to the first optical disk signal and the RF signal component; and a subtractor for subtracting an output signal of the second gain amplifier from an output signal of the first gain amplifier. Then, the wobble signal extracting circuit is characterized by evaluating the output signal of the subtractor and controlling at least one of the first and second gain amplifiers based on the result. According to Japanese Unexamined Patent Publication No. 2005-196846, at least one gain of a first gain amplifier and a second gain amplifier is feedback controlled and a high-precision wobble signal that does not include the RF signal component can be extracted.

Moreover, a technology concerning the optical disk unit capable of detecting the wobble signal and the LPP signal with a simple configuration is disclosed in International Patent Publication WO2005/015548. FIG. 1 is a block diagram showing a configuration of the optical disk unit of International Patent Publication No. WO2005/015548. Referring to FIG. 1, the optical disk unit is equipped with: a spindle motor 202; an optical head 203; a servo signal/readout signal generator 204, a focus/track control part 205; a wobble detection balance adjustment circuit 206; a wobble balance detector 207, a wobble detection differential amplifier 208; an LPF (low pass filter) 209; an A/D (analog-to-digital converter) 210; an HPF (high-pass filter) 211; an amplitude detector 212; an LPF 213; a wobble signal detector 214; an A/D 215; a readout signal detector 216; a recording/regenerating PLL circuit 217; a residual component removing circuit 218; an LPF 219; an LPP binarization circuit 220; an LPP address detector 221; a demodulator circuit 222; an error correction code encode/decode circuit 223; a modulation demodulation control circuit 224; a modulator circuit 225; a laser drive waveform generating circuit 226; a laser driver circuit 227; a gating signal generator 228; a CPU 229; a summing amplifier 230; an LPF 231: a binarization circuit 232; a latch circuit 233, and a control signal generating circuit 234.

Principal parts in the optical disk unit of International Patent Publication No. WO2005/015548 will be explained below. The optical head 203 has a tracking detector that detects first and second detection signals based on the reflected light rays of a laser irradiated on the optical disk with first and second detectors placed on the both sides of a division line along the longitudinal direction of the track.

The wobble detection balance adjustment circuit 206 receives the first detection signal and the second detection signal, adjusts them so that the signal level of the first detection signal and the signal level of the second detection signal may become equal to each other, and outputs respective detection signals. A wobble detection differential amplifier circuit 208 generates the wobble detection differential signal that is a difference between the first detection signal and the second differential signal whose signal levels were adjusted by the wobble detection balance adjustment circuit 206. The A/D 210 converts the wobble detection differential signal generated by the wobble detection differential amplifier circuit 208 into a digital signal. The wobble signal detector 214 detects the wobble signal based on the wobble detection differential signal that was converted into the digital signal by the A/D 210.

The summing amplifier 230 generates a sum signal that is a sum of the first detection signal and the second detection signal whose signal levels were adjusted by the wobble detection balance adjustment circuit 206. The binarization circuit 232 converts the sum signal generated by the summing amplifier 230 into a binarized signal by comparing it with a signal of a predetermined level. The latch circuit 233 converts the output signal of the binarization circuit 232 into a recording timing signal by latching it with a conversion clock of the A/D 210 or a clock having a frequency that is an integer times the conversion clock. The control signal generating circuit 234 generates a control signal for removing the residual signal component that is a residual component of the recording signal included in the wobble detection differential signal based on the recording timing signal that is an output signal of the latch circuit 233 and the wobble detection differential signal that was converted into the digital signal.

The residual component removing circuit 218 extracts a land prepit detection signal by removing the residual signal component included in the wobble detection differential signal that was converted into a digital signal based on the control signal supplied from the control signal generating circuit 234. An LPP address detector circuit 221 detects address information based on the land prepit detection signal outputted from the residual component removing circuit 218. Since the optical disk unit of International Patent Publication No. WO2005/015548 can acquire respective optimum conditions for detection of the wobble signal and the LPP signal using one wobble detection balance adjustment circuit 206 and one wobble detection differential amplifier 208, it becomes possible to detect the wobble signal and the LPP signal with a simple configuration.

SUMMARY

In an area where recording marks are formed on an optical disk, wobble signal components appear in mutually reverse phases in an AD component detection signal and in a BC component detection signal, and in addition to this, an RF signal component in phase is included therein. Usually, the strength of the RF signal component is large about by one order compared with the strength of a component accompanying meandering of a wobble. Therefore, in the case where the AD component detection signal and the BC component detection signal are digitized directly by an analog-to-digital converter after gain adjustment like an embodiment described in Japanese Unexamined Patent Publication No. 2009-146502, if resolution of the analog-to-digital converter is insufficient, the wobble signal components included in the AD component detection signal and the BC component detection signal will be embedded in quantization noises of the converter. As a result, there is a possibility that the wobble signal component may not be correctly reflected in the push-pull signal obtained by taking a difference between converter outputs. Conversely, if an input signal amplitude into the analog-to-digital converter is made large as much as the wobble signal component may not be embedded by the quantization noise, it exceeds a dynamic range of the converter because of the RF signal component with a large amplitude that is superposed; therefore, it will be difficult to obtain the wobble signal component. From these reasons, digitizing the wobble signal component will require an analog-to-digital converter having an extremely high quantization resolution. The analog-to-digital converter with a high resolution has a large circuit scale and large power consumption, becoming an obstruction when holding down the cost of the optical disk unit and reducing its power consumption. This problem is the same also in the case where a configuration of controlling a magnification of one of gain adjustment amplifiers is used like Japanese Unexamined Patent Publication No. 2005-196846, becoming a barrier accompanying digitization of the processing.

On the other hand, in International Patent Publication No. WO2005/015548, the wobble detection differential signal and a sum signal are generated after the gain adjustment, and subsequently they are digitized. However, an optical disk unit of International Patent Publication No. WO2005/015548 has an object of improving a detection ratio of land prepits, and cannot realize removal of the RF signal component in order to extract a high-quality clock.

In the below, reference numerals used in the mode for carrying out the invention (embodiment) are used with parentheses to describe the means for solving the problem. These reference numerals are added to clarify correspondence between the description of what is claimed is and the description of the mode for carrying out the invention (embodiment), and shall not be used for interpretation of a technological scope of the invention described in what is claimed is.

The wobble signal extracting circuit according to an aspect of the present invention includes: a readout signal generator (11) for generating an RF signal by adding the first detection signal and the second detection signal that correspond to reflected light rays of areas inside and outside a recording track among reflected light rays from the optical disk; a first subtractor (22) for generating the push-pull signal by subtracting the first detection signal and the second detection signal; a first analog-to-digital converter (12) for converting the RF signal into a digital signal; a second analog-to-digital converter (23) for converting the push-pull signal into a digital signal; a residual RF component generating circuit (5) for generating a residual RF signal component equivalent to the RF signal component remaining in the digitized push-pull signal; and a second subtractor (6) for generating the wobble signal by subtracting the residual RF signal component from the digitized push-pull signal. The residual RF component generating circuit (5) generates the residual RF signal component so that it may approach the remaining RF signal component based on correlation between the wobble signal and the digitized RF signal.

A method for extracting a wobble signal according to another aspect of the present invention includes the steps of: generating the RF signal by adding the first detection signal and the second detection signal that correspond to the reflected light rays of the areas inside and outside the recording track, respectively, among the reflected light rays from the optical disk; generating the push-pull signal by performing subtraction between the first detection signal ad the second detection signal; converting the RF signal into a digital signal; converting the push-pull signal into a digital signal; generating the residual RF signal component equivalent to the RF signal component remaining in the digitized push-pull signal; and generating the wobble signal by subtracting the residual RF signal component from the digitized push-pull signal. The step of generating the residual RF signal component generates the residual RF signal component so that it may approach the remaining RF signal component based on the correlation between the wobble signal and the digitized RF signal.

The optical disk unit of the present invention has the above-mentioned wobble signal extracting circuit and a signal processing part (101) that records data onto the optical disk and reads the data from the optical disk based on the wobble signal outputted from the wobble signal extracting circuit.

It is possible for the wobble signal extracting circuit of the present invention to efficiently remove the RF signal component from the push-pull signal without using a high-resolution analog-to-digital converter and to extract the high-quality wobble signal.

BRIEF DESCRIPTION OF THE DRAWINGS

FIGS. 3A to 3E are diagrams showing each a signal waveform obtained by a wobble signal extracting circuit of the present invention, in which FIG. 3A is the waveform of an AD component detection signal, FIG. 3B is the waveform of a BC component detection signal, FIG. 3C is the waveform of a push-pull signal, FIG. 3D is the waveform of a residual RF component, and FIG. 3E is the waveform of wobble signal;

FIGS. 4A to 4E are waveform charts each showing an effect of a residual RF differential term, in which FIG. 4A is the waveform of an RF signal, FIG. 4B is an RF signal remaining in the push-pull signal, FIG. 4C is the waveform of a residual RF proportional term, FIG. 4D is the waveform of a residual RF differential term, and FIG. 4E is the waveform of a residual RF component;

DETAILED DESCRIPTION

Hereafter, with reference to accompanying drawings, a wobble signal extracting circuit, a method for extracting a wobble signal, and an optical disk unit by embodiments of the present invention will be described.

First Embodiment

Figure 1:
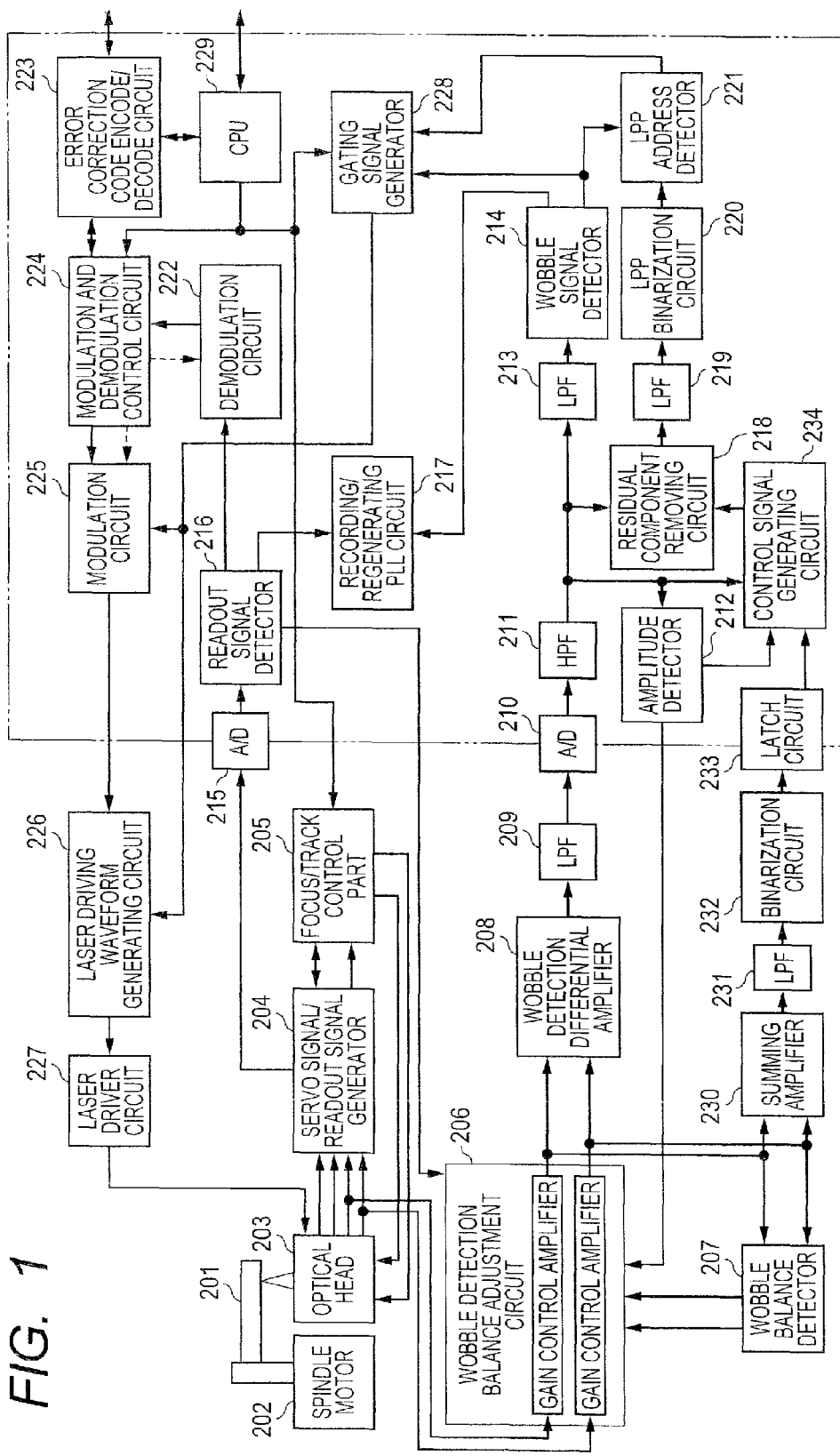
FIG. 1 is a block diagram showing a configuration of an optical disk unit of International Patent Publication No. WO2005/015548.
Figure 2:
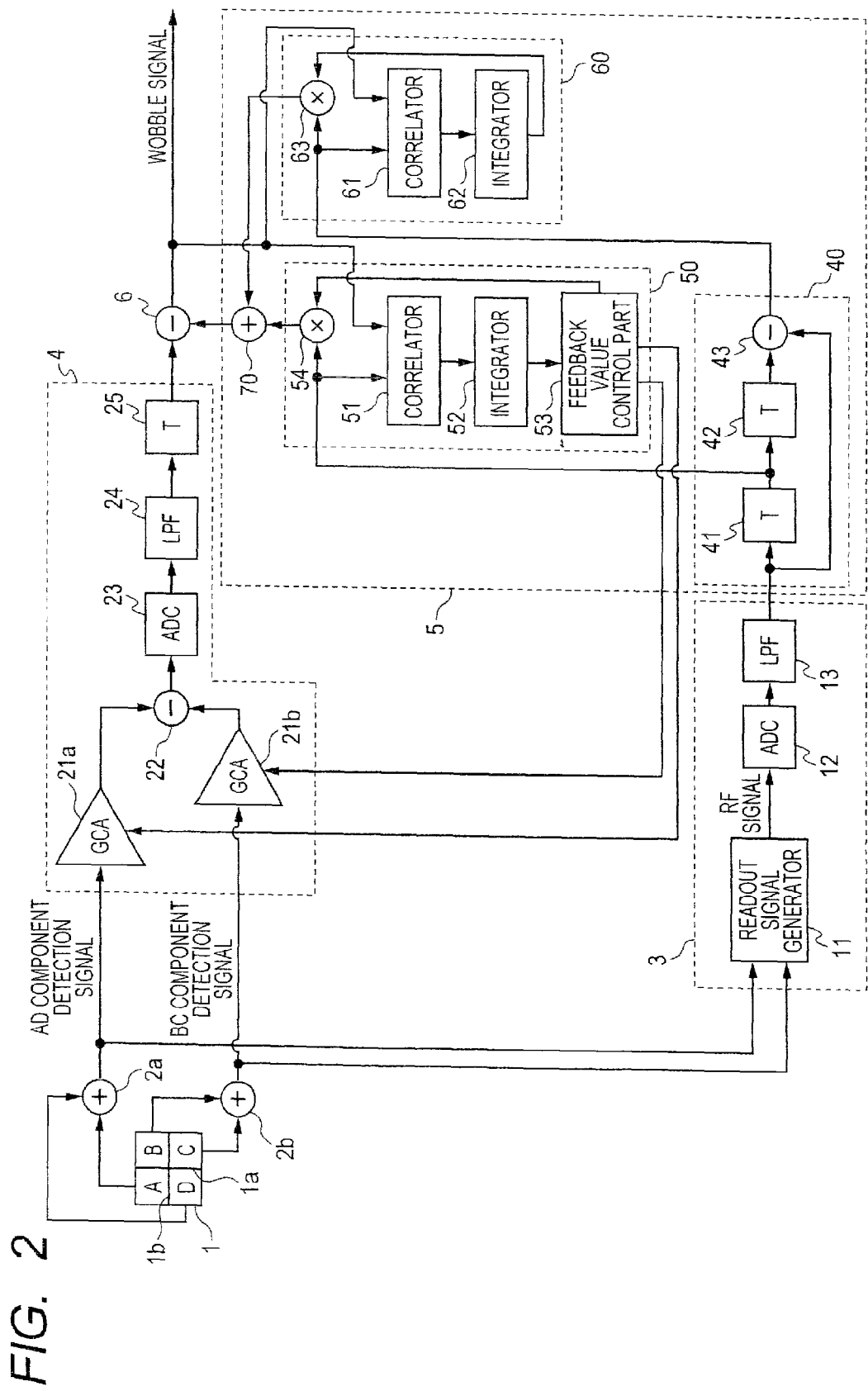
FIG. 2 is a block diagram showing a configuration of a wobble signal extracting circuit by a first embodiment of the present invention.

A first embodiment of the present invention will be explained. FIG. 2 is a block diagram showing a configuration of a wobble signal extracting circuit by the first embodiment of the present invention. Referring to FIG. 2, the wobble signal extracting circuit has a photo detector 1, an adder 2a, an adder 2b, an RF signal part 3, a push-pull signal part 4, a residual RF component generating circuit 5, and a subtractor 6.

The photo detector 1 receives reflected light rays from the optical disk (not illustrated), and outputs a signal according to the amount of received light rays. The photo detector 1 has four light receiving parts that are divided by a parting line 1a and a parting line 1b (a light receiving part A, a light receiving part B, a light receiving part C, and a light receiving part D). The parting line 1a corresponds to a direction along a recording track, and the parting line 1b corresponds to a direction perpendicular to the recording track. The light receiving part A and the light receiving part D receive the reflected light rays from an area inside the recording track and output a signal according to the amount of received light rays. The light receiving part B and the light receiving part C receive the reflected light rays from an area outside the recording track and output a signal according to the amount of received light rays.

The adder part 2a receives signals from the light receiving part A and the light receiving part D, and outputs an AD component detection signal obtained by adding the two signals. The adder part 2b receives signals from the light receiving part B and the light receiving part C, and outputs a BC component detection signal obtained by adding the two signals. FIG. 3A and FIG. 3B are diagrams showing waveforms obtained by the wobble signal extracting circuit of the present invention, in which FIG. 3A is a waveform indicating the AD component detection signal and FIG. 3B is a waveform indicating the BC component detection signal.

The RF signal part 3 generates a digitized RF signal based on the AD component detection signal and the BC component detection signal that correspond to reflected light rays of areas inside and outside the recording track, respectively, among reflected light rays from the optical disk. The RF signal part 3 is equipped with a readout signal generator 11, an analog-to-digital converter (ADC) 12, and a low pass filter (LPF) 13.

The readout signal generator 11 generates an RF signal proportional to the brightness/darkness produced by the existence/absence of recording marks by adding the AD component detection signal and the BC component detection signal. The analog-to-digital converter 12 converts the RF signal into a digital signal. A low pass filter 13 receives the digitized RF signal outputted from the analog-to-digital converter 12, and removes unnecessary high-frequency components.

The push-pull signal part 4 generates a digitized push-pull signal based on the AD component detection signal and the BC component detection signal. The push-pull signal part 4 is equipped with a gain adjustment amplifier (GCA) 21a, a gain adjustment amplifier (GCA) 21b, a subtractor 22, an analog-to-digital converter (ADC) 23, a low pass filter (LPF) 24, and a delay circuit (T) 25.

The gain adjustment amplifier 21a receives the AD component detection signal from the adder 2a, adjusts a magnification of the AD component detection signal based on a gain control signal from the residual RF component generating circuit 5 that will be described later, and outputs the AD component detection signal whose gain was adjusted. Similarly, the gain adjustment amplifier 21b receives the BC component detection signal from the adder 2b, adjusts a magnification of the BC component detection signal based on a gain control signal from the residual RF component generating circuit 5, and outputs the BC component detection signal whose gain was adjusted.

The subtractor 22 performs subtraction between the AD component detection signal whose gain was adjusted and the BC component detection signal whose gain was adjusted, and generates a push-pull signal. FIG. 3C is a waveform of the push-pull signal.

The analog-to-digital converter 23 receives the push-pull signal outputted from the subtractor 22, and performs digital conversion of the push-pull signal. When processing the reflected light rays from a recorded area on the optical disk, as shown in FIGS. 3A and 3B, the RF signal in phase according to the existence/absence of the recording mark is superposed on the AD component detection signal and the BC component detection signal. On the other hand, the RF signal component included in the push-pull signal acquired by a difference between the two is small as shown in FIG. 3C. Therefore, the analog-to-digital converter 23 becomes sufficient if it can provide a resolution required to digitize the wobble signal component of a sine waveform shape plus some quantity of allowance.

The low pass filter 24 receives the digitized push-pull signal outputted from the analog-to-digital converter 23, and removes unnecessary high-frequency components. The delay circuit 25 adjusts the delay amount of the digitized push-pull signal and outputs it.

The residual RF component generating circuit 5 operates so as to reduce the RF signal component remaining in the digitized push-pull signal. Specifically, the residual RF component generating circuit 5 generates a residual RF signal component equivalent to the RF signal component remaining in the digitized push-pull signal based on correlation between the digitized RF signal component received from the low pass filter 13 and the wobble signal received form the subtractor 6 that will be described later. Especially, when the generated residual RF signal component is out of the RF signal component remaining in the digitized push-pull signal in waveform, the residual RF component generating circuit 5 generates a residual RF signal component corrected so that a gap may decrease (so that the residual RF signal component may approach the remaining RF signal component). Moreover, the residual RF component generating circuit 5 generates the gain control signal for the gain adjustment amplifiers 21a, 21b so as to reduce the RF signal component remaining in the digitized push-pull signal. FIG. 3D is an example of a waveform of the residual RF component. Incidentally, further details in the residual RF component generating circuit 5 will be described later.

The subtractor 6 receives the digitized push-pull signal outputted from a delay circuit 25 and the residual RF signal component outputted from the residual RF component generating circuit 5. The subtractor 6 generates the wobble signal by subtracting the residual RF signal component from the digitized push-pull signal. When the residual RF signal component that the residual RF component generating circuit 5 generates is correctly generated as one that is equivalent to the RF signal component remaining in the digitized push-pull signal, the subtractor 6 can generate an accurate wobble signal. FIG. 3E is an example of a waveform of the accurate wobble signal. On the other hand, when the residual RF signal component that the residual RF component generating circuit 5 generates is not generated correctly (when not in agreement), the wobble signal that the subtractor 6 generates includes the RF signal component that has not been removed completely. In that case, as described above, the residual RF component generating circuit 5 generates the residual RF signal component whose gap with the RF signal component remaining in the digitized push-pull signal is corrected based on correlation between the digitized RF signal and the wobble signal. Thereby, it is possible for the wobble signal extracting circuit of the present invention to output an accurate wobble signal having few remaining RF signal components.

Referring to FIG. 2, details of the residual RF component generating circuit 5 will be explained. The residual RF component generating circuit 5 is equipped with an RF signal converter circuit 40, a proportional term output circuit 50, a differential term output circuit 60, and an adder 70.

The RF signal converter circuit 40 converts the digitized RF signal into a proportional term signal that is proportional to the digitized RF signal, and then converts it into a differential term signal that is proportional to the variation of the digitized RF signal. The RF signal converter circuit 40 includes a delay circuit (T) 41, a delay circuit (T) 42, and a subtractor 43.

A delay circuit 41 generates the proportional term signal by delaying the digitized RF signal. A delay circuit 42 generates a signal obtained by further delaying the proportional term signal. The subtractor 43 generates the differential term signal that is a difference between the digitized RF signal outputted from the low pass filter 13 and the digitized RF signal outputted from the delay circuit 42, namely, a difference between the digitized RF signals whose delay amounts are different. That is, the RF signal converter circuit 40 converts the digitized RF signal into the proportional term signal that is proportional to the digitized RF signal and into the differential term signal that is proportional to the variation of the digitized RF signal.

The proportional term output circuit 50 receives the proportional term signal and the wobble signal, and generates the residual RF proportional term such that a magnification of the proportional term signal is corrected based on correlation between the proportional term signal and the wobble signal.

The proportional term output circuit 50 includes a correlator 51, an integrator 52, a feedback value control part 53, and a multiplier 54.

The correlator 51 receives the proportional term signal outputted from the RF signal converter circuit 40 and the wobble signal outputted from the subtractor 6. According to the strength of correlation between the proportional term signal and the wobble signal, the correlator 51 outputs a positive signal when the two are of the same polarity or outputs a negative signal when the two are of opposite polarities. The integrator 52 integrates with the signal outputted from the correlator 51, and updates its output value. In other words, the integrator 52 outputs a value with a large absolute value when the correlation between the proportional term signal and the wobble signal is large (when the remaining RF signal component is large) and outputs a value with a small absolute value when the correlation is low (when the remaining RF signal component is small).

The feedback value control part 53 converts a component that corresponds to a high-order digit of a value outputted from the integrator 52 into the magnification of the gain adjustment amplifier 21a and the gain adjustment amplifier 21b, and outputs it as the gain control signal. Furthermore, the feedback value control part 53 outputs a component that corresponds to a low-order digit to the multiplier 54 as a coefficient for correcting the magnification of the proportional term signal. The multiplier 54 generates the residual RF proportional term obtained by multiplying the proportional term signal and the coefficient. That is, the proportional term output circuit 50 outputs the gain control signal and the residual RF proportional term when the magnitude of the RF signal component in the wobble signal is larger than a predetermined value, and generates only the residual RF proportional term when it is smaller than the predetermined value.

An explanation is added for the proportional term output circuit 50. When the integrator 52 starts an operation setting its initial value to zero, the high-order digit does not change and the magnifications of the gain adjustment amplifiers 21a and 21b are maintained at an equal magnification. If the RF signal component remains in the wobble signal, a signal proportional to the magnitude of the remaining portion is outputted from the correlator 51, and increases and decreases an output of the integrator 52. The output variation of the integrator 52 appears in the low-order digit first, and a multiplication result of a low-order digit component and the proportional term signal is outputted from the multiplier 54 as a residual RF proportional term. When the RF signal component remaining in the push-pull signal is small, the residual RF proportional term negates the RF signal component in the wobble signal, and thereby, a mean value of the signal outputted from the correlator 51 becomes zero, and is stabilized.

On the other hand, when a balance gap of the AD component detection signal and the BC component detection signal is large, an influence of increase and decrease also exerts on the high-order digit of the integrator 52 of the proportional term output circuit 50. The feedback value control part 53 decodes the high-order digit, and operates as follows: when the output value is positive, it reduces a gain of the gain adjustment amplifier 21a by one step and raises the gain of the gain adjustment amplifier 21b by one step; when the output value is negative, it raises the gain of the gain adjustment amplifier 21a by one step and reduces the gain adjustment amplifier 21b by one step. Thereby, the RF signal component superimposing on the push-pull signal that is given to an analog-to-digital converter 23 can be suppressed to a certain amount or less. Furthermore, the RF signal component accompanying a minute balance gap that cannot be removed by gain adjustment will be effectively removed by the subtractor 6 as an RF signal component remaining after digitization.

A differential term output circuit 60 generates a residual RF differential term by correcting a magnification of the differential term signal proportional to the variation of the digitized RF signal based on correlation between the differential term signal and the wobble signal. The differential term output circuit 60 includes a correlator 61, an integrator 62, and a multiplier 63.

The correlator 61 receives the differential term signal outputted from the RF signal converter circuit and the wobble signal outputted from the subtractor 6. Like the correlator 51, according to the strength of the correlation between the differential term signal and the wobble signal, the correlator outputs a positive signal when the two are of the same polarity and outputs a negative signal when the two are of opposite polarities. The integrator 62 integrates the signal outputted from the correlator 61 to update its output value, and outputs it to the multiplier 63 as a coefficient for correcting the magnification of the differential term signal. The multiplier 63 generates the residual RF differential term that is a multiplication result of the differential term signal and the coefficient. Incidentally, an effect of this differential term signal will be described later.

The adder 70 generates the residual RF signal component by adding the residual RF proportional term and the residual RF differential term. Thus, the residual RF component shown in FIG. 3D is generated.

FIG. 4 is a waveform chart showing the effect of the residual RF differential term. When discrete analog-to-digital converters digitize the RF signal and the push-pull signal, respectively, there is a case where a delay time difference may appear before digitization. FIG. 4A is a waveform of the digitized RF signal. FIG. 4B is a waveform of the RF signal component remaining in the digitized push-pull signal. There is the delay time difference At between (a) and (b). FIG. 4C is a waveform of the residual RF proportional term generated by adjusting a magnification of the digitized RF signal. In the case where there is a gap in delay amount in this way, a signal that agrees with the residual component cannot be produced only by the residual RF proportional term of FIG. 4C.

In the RF signal component remaining in the digitized push-pull signal, a component that has a gap with respect to the digitized RF signal is proportional to the variation of the digitized RF signal. FIG. 4D is a residual RF differential term generated by adjusting the magnification of the differential term signal that is proportional to the variation of the digitized RF signal. The residual RF differential term can compensate a gap generated by the delay time difference between the digitized RF signal and the RF signal component remaining in the digitized push-pull signal. That is, a waveform of the residual RF signal component of FIG. 4E obtained by adding the residual RF proportional term and the residual RF differential term becomes a waveform close to that of the residual RF signal component remaining in the digitized push-pull signal. In other words, in the differential term output circuit 60 described above, the integrator 62 outputs a coefficient of a large multiplication when the correlation between the differential term signal and the wobble signal is high (when a component having a gap in delay amount is large in the RF signal component remaining in the digitized push-pull signal), and outputs a coefficient of a small multiplication when the correlation is low (when the component having a gap in delay amount is small in the RF signal component remaining in the digitized push-pull signal).

Figure 5A:
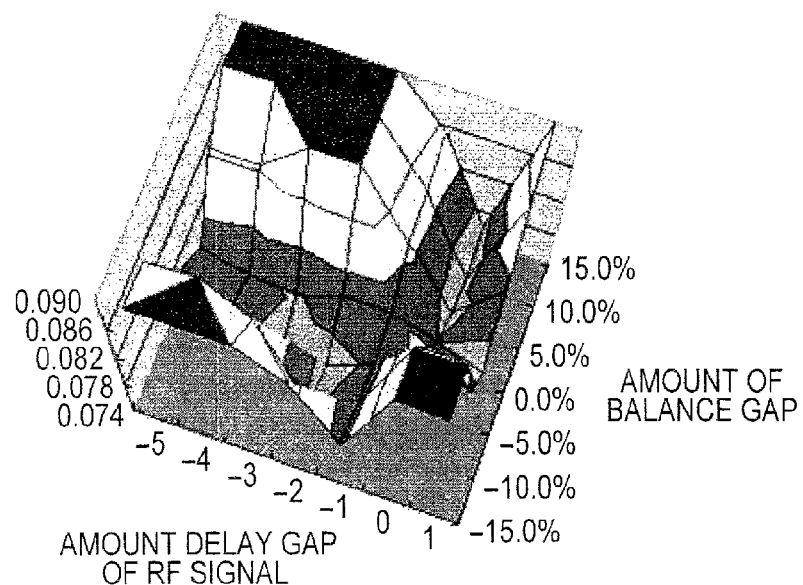
FIG. 5 illustrates a simulation result of the amount of noise remaining in a wobble signal when there are an amount delay gap and a balance gap.
Figure 5B:
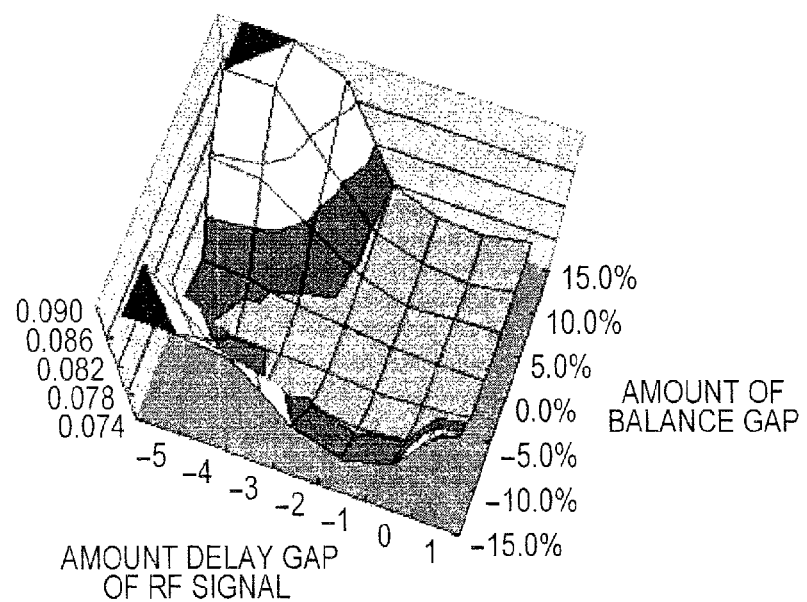

FIG. 5 illustrates a simulation result of the amount of noise remaining in the wobble signal when there are an amount delay gap and the balance gap. In FIG. 5, the horizontal axis represents the amount delay gap of the digitized RF signal, the axis in a depth direction represents the amounts of balance gap of the AD component detection signal and the BC component detection signal, and the axis in a height direction represents the standard deviation of the phase error when synchronization is taken based on the wobble signal. FIG. 5A is the amount of residual noise at the time of using only the residual RF proportional term. Referring to FIG. 5A, it is shown that when the amount delay gap of the RF signal is at an optimal point, the residual component can be controlled small even if the balance gap reaches about ±15%, but when there is the amount delay gap, the RF signal cannot be removed sufficiently. On the other hand, FIG. 5C is the amount of residual noise in the case where the residual RF signal component is generated using a sum of the residual RF proportional term and the residual RF differential term. Referring to FIG. 5B, it is shown that a range where the amount of noise remaining in the wobble signal can be controlled small is widened compared to a case where only the residual RF proportional term is used. In this way, an effect of extending the margin for the amount delay gap can be obtained by using the residual RF differential term together.

Moreover, a frequency band of the wobble signal is narrower than the RF signal band. For this reason, the residual RF signal component can be generated with high precision by setting up cut-off frequencies of the low pass filter 13 and the low pass filter 24 to the wobble signal band. Moreover, the same effect can be obtained in the case where the low pass filter 24 is placed before an analog-to-digital converter 23 and this configuration is realized by an analog circuitry.

As described above, in the wobble signal extracting circuit of the present invention, it is possible to remove the RF signal component efficiently from the push-pull signal and to extract the high-quality wobble signal without using the high-resolution analog-to-digital converter whose circuit scale and power consumption are large.

Second Embodiment

Figure 6:
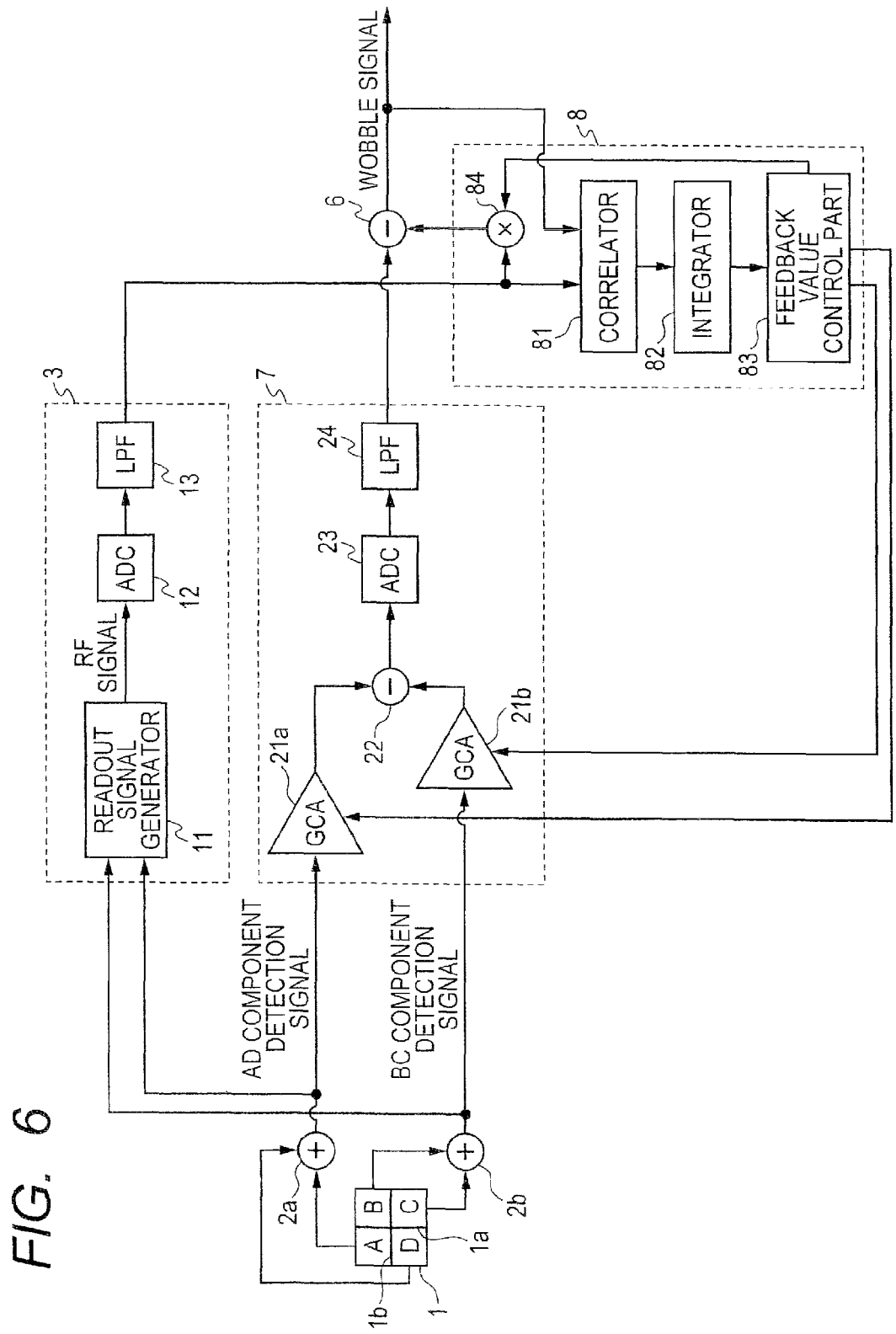
FIG. 6 is a block diagram showing a configuration of the wobble signal extracting circuit by a second embodiment of the present invention.

A second embodiment of the present invention will be explained. FIG. 6 is a block diagram showing a configuration of a wobble signal extracting circuit by the second embodiment of the present invention. Referring to FIG. 6, the wobble signal extracting circuit has the photo detector 1, the adder 2a, the adder 2b, the RF signal part 3, the subtractor 6, a push-pull signal part 7, and a residual RF component generating circuit 8. The same reference numerals are used to the same configurations as those of the first embodiment and overlapping explanations are omitted.

The push-pull signal part 7 is of a configuration of the push-pull signal part of the first embodiment with the delay circuit 25 removed therefrom.

The residual RF component generating circuit 8 is of the same configuration as that of the proportional term output circuit 50 in the residual RF component generating circuit 5 of the first embodiment. The residual RF component generating circuit 8 is equipped with a correlator 81, an integrator 82, a feedback value control part 83, and a multiplier 84. The correlator 81 is equivalent to the correlator 51 of the proportional term output circuit 50, the integrator 82 is equivalent to the integrator 52, the feedback value control part 83 is equivalent to the feedback value control part 53, and the multiplier 84 is equivalent to the multiplier 54.

The wobble signal extracting circuit by the second embodiment operates similarly with the wobble signal extracting circuit of the first embodiment. That is, the readout signal generator 11 generates the RF signal by adding the AD component detection signal and the BC component detection signal that correspond to the reflected light rays of the areas inside and outside the recording track, respectively, among the reflected light rays from the optical disk. Moreover, the subtractor 22 generates the push-pull signal by performing subtraction between the AD component detection signal and the BC component detection signal. Furthermore, the analog-to-digital converter 12 converts the RF signal into a digital signal; the analog-to-digital converter 23 converts the push-pull signal into a digital signal. The low pass filter 13 performs band limiting on the digitized RF signal; the low pass filter 24 performs band limiting on the digitized push-pull signal.

The residual RF component generating circuit 8 generates the residual RF signal component equivalent to the RF signal component remaining in the digitized push-pull signal. In detail, in the residual RF component generating circuit 8, like the proportional term output circuit 50 of the first embodiment, the output of the integrator 82 varies according to the correlation between the digitized RF signal (the proportional term signal) and the wobble signal. The low-order digit of the integrator 82 is sent to the multiplier 84 as a coefficient by the feedback value control part 83. The multiplier 84 generates the residual RF signal component by adjusting the magnification of the digitized RF signal (the proportional term signal). The subtractor 6 outputs the wobble signal by subtracting the residual RF signal component from the digitized push-pull signal. Moreover, the high-order digit of the integrator 82 is decoded by the feedback value control part 83, and is used for magnification control by the gain adjustment amplifiers 21a, 21b. In series of operations, the residual RF component generating circuit 8 corrects the residual RF signal component so that it may approach the RF signal component remaining in the digitized push-pull signal based on the digitized RF signal and the wobble signal.

Since the wobble signal extracting circuit by the second embodiment of the present invention does not has a configuration of calculating the residual RF differential term, it can extract the wobble signal with a much simplified circuit configuration. This is especially effective in the case where a residual component caused by the amount delay gap can be ignored.

Third Embodiment

Figure 7:
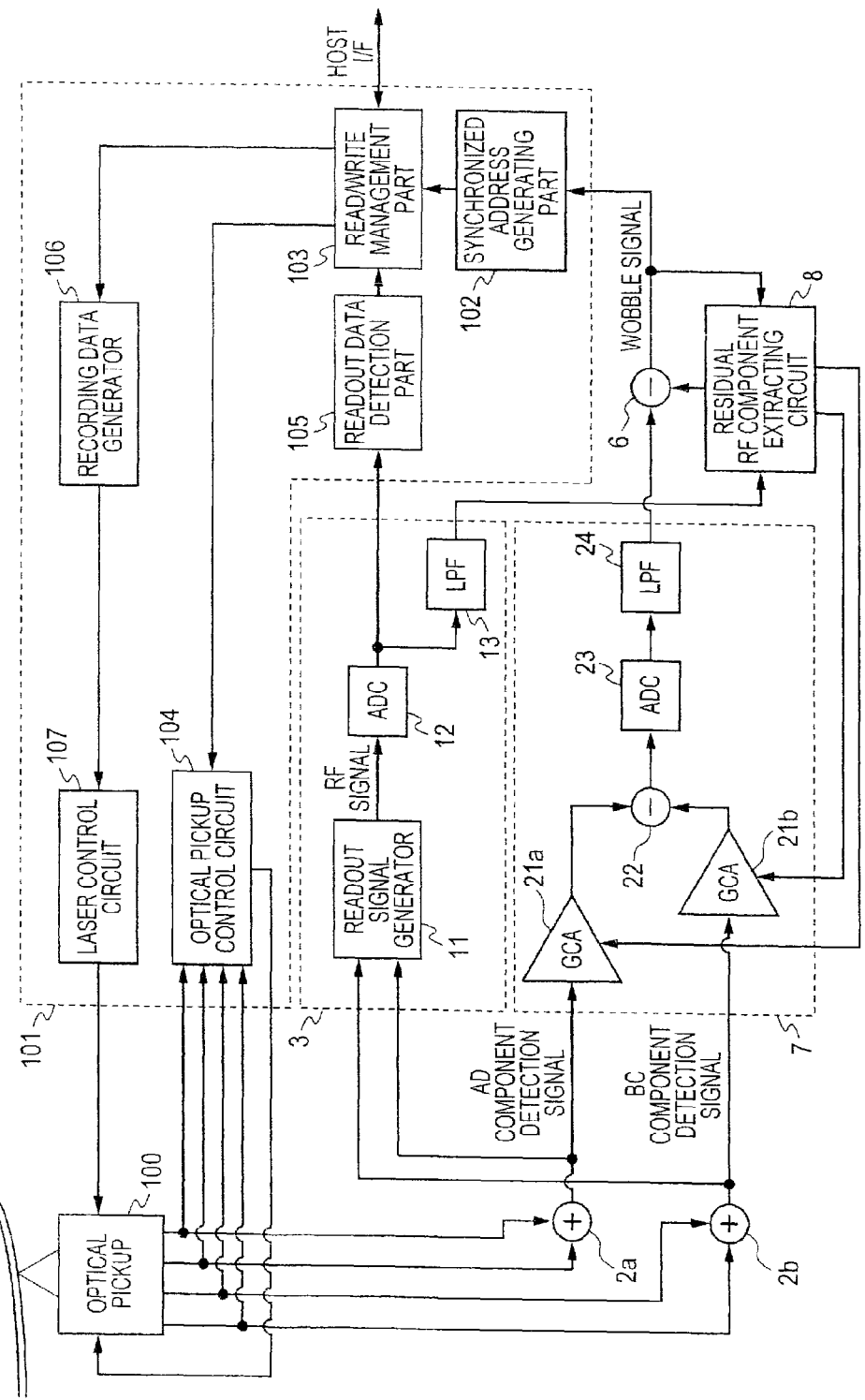
FIG. 7 is a block diagram showing a configuration of an optical disk unit by a third embodiment of the present invention.

A third embodiment of the present invention will be explained. FIG. 7 is a block diagram showing a configuration of an optical disk unit by the third embodiment of the present invention. Referring to FIG. 7, the optical disk unit has a configuration as the wobble signal extracting circuit according to the second embodiment (the adder 2a, the adder 2b, the RF signal part 3, the subtractor 6, the push-pull signal part 7, the residual RF component generating circuit 8), an optical pickup 100, and a signal processing part 101.

The optical pickup 100 has a photo detector 1 (not illustrated) explained as the wobble signal extracting circuit. The optical pickup 100 irradiates a laser beam onto an optical disk 110. The optical pickup 100 receives the reflected light rays with the photo detector 1, and outputs a signal according to the amount of received light rays. The adder part 2a receives the signal from the optical pickup 100, and outputs the AD component detection signal obtained by adding signals by the light receiving parts inside the recording track. The adder part 2b receives the signal from the optical pickup 100, and outputs the BC component detection signal obtained by adding signals by the outside light receiving parts.

The RF signal part 3 generates a digitized RF signal based on the AD component detection signal and the BC component detection signal. The push-pull signal part 7 generates a digitized push-pull signal based on the AD component detection signal and the BC component detection signal. Operations here are the same as those of the first and second embodiments.

The residual RF component generating circuit 8 performs magnification correction of the gain adjustment amplifiers 21a, 21b, and also generates the residual RF signal component equivalent to the RF signal component included in the digitized push-pull signal. Incidentally, the push-pull signal part 7 and the residual RF component generating circuit 8 may be the push-pull signal part 4 and the residual RF component generating circuit 5 by the first embodiment, respectively. The subtractor 6 generates the wobble signal by subtracting the residual RF component from the digitized push-pull signal. The generated wobble signal is used for recording and reading processings.

The signal processing part 101 records data onto the optical disk 110, and reads data from the optical disk 110 based on the generated wobble signal. The signal processing part 101 is equipped with a synchronized address generating part 102, a read/write management part 103, an optical pickup control circuit 104, a readout data detection part 105, a recording data generator 106, and a laser control circuit 107.

The synchronized address generating part 102 generates a synchronous clock from the wobble signal, and extracts position information further. The read/write management part 103 distinguishes a recording and reading position based on a control signal transferred from a host circuit that is not illustrated through a host I/F. The optical pickup control circuit 104 makes the optical pickup 100 move to an object position for recording and reading of the optical disk 110 based on a control signal from the read/write management part 103.

The readout data detection part 105 converts the digitized RF signal into a data row. At the reading position, the read/write management part 103 receives the data row from the readout data detection part 105, and sends it out to the host circuit through the host I/F. Moreover, at a recording position, the read/write management part 103 converts the data row received from the host circuit into a recording pulse train through the recording data generator 106. The laser control circuit 107 records the data at a predetermined position on the optical disk 110 by controlling the optical pickup 100 according to a light emission power record pulse train of an unillustrated semiconductor laser mounted on the optical pickup 100.

The optical disk unit by the third embodiment of the present invention produces an effect of reducing detection errors of the recording and reading address by the signal processing part 101 using the wobble signal that has a small amount of the RF signal component. Furthermore, since the optical disk unit of the present invention makes small the variation of generation timing of the data row, it produces an effect of having a high recording quality with a simple configuration. The present invention explained in the forgoing can appropriately alter each embodiment within a range of technological thought.

What is claimed is:

1. A wobble signal extracting circuit, comprising:
   a readout signal generating circuit for generating an RF signal by adding a first detection signal and a second detection signal that correspond to reflected light rays of areas inside and outside a record track, respectively, among reflected light rays from an optical disk;
   a first subtractor for generating a push-pull signal by performing subtraction between the first detection signal and the second detection signal;
   a first analog-to-digital converter for converting the RF signal into a digital signal;
   a second analog-to-digital converter for converting the push-pull signal into a digital signal;
   a residual RF component generating circuit for generating a residual RF signal component equivalent to an RF signal component remaining in the digitized push-pull signal; and
   a second subtractor for generating the wobble signal by subtracting the residual RF signal component from the digitized push-pull signal,
   wherein the residual RF component generating circuit generates the residual RF signal component so that it may approach the remaining RF signal component based on correlation between the wobble signal and the digitized RF signal.

2. The wobble signal extracting circuit according to claim 1,
   wherein the residual RF component generating circuit is equipped with a proportional term output circuit for generating a residual RF proportional term that is proportional to the digitized RF signal and such that a magnification of a proportional term signal is corrected based on correlation between the proportional term signal and the wobble signal, and
   the second subtractor generates the wobble signal by subtracting the residual RF signal component including the residual RF proportional term from the digitized push-pull signal.

3. The wobble signal extracting circuit according to claim 2,
   wherein the residual RF component generating circuit includes:
   a differential term output circuit for generating a residual RF differential term such that a magnification of the differential term signal is corrected based on correlation between the differential term signal proportional to the variation of the digitized RF signal and the wobble signal; and
   an adder for generating the residual RF signal component by adding the residual RF proportional term and the residual RF differential term; and
   wherein the second subtractor generates the wobble signal by subtracting the residual RF signal component that includes the residual RF proportional term and the residual RF differential term from the digitized push-pull signal.

4. The wobble signal extracting circuit according to claim 2, further comprising:
   a first gain adjustment part for adjusting a gain of the first detection signal; and
   a second gain adjustment part for adjusting a gain of the second detection signal,
   wherein the proportional term output circuit outputs a gain control signal to the first gain adjustment part and the second gain adjustment part when the magnitude of the RF signal component remaining in the wobble signal is larger than a predetermined value,
   wherein the first gain adjustment part outputs the first detection signal whose gain was adjusted based on the gain control signal, and
   wherein the second gain adjustment part outputs the second detection signal whose gain was adjusted based on the gain control signal.

5. The wobble signal extracting circuit according to claim 1, further comprising:
   a first low pass filter for removing unnecessary frequency components from the digitized RF signal according to a band of the wobble signal in a subsequent stage of the first analog-to-digital converter; and
   a second low pass filter for removing unnecessary frequency components from the digitized push-pull signal according to the band of the wobble signal in a subsequent stage of the second analog-to-digital converter.

6. An optical disk unit, comprising:
   the wobble signal extracting circuit according to claim 1; and a signal processing part that records data onto the optical disk or reads data from the optical disk based on wobble signal outputted from the wobble signal extracting circuit.

7. A method for extracting a wobble signal, comprising the steps of:
generating an RF signal by adding a first detection signal and a second detection signal that correspond to reflected light rays of areas inside and outside a recording track, respectively, among reflected light rays from an optical disk;
generating a push-pull signal by performing subtraction between the first detection signal and the second detection signal;
converting the RF signal into a digital signal;
converting the push-pull signal into a digital signal;
generating a residual RF signal component that is equivalent to an RF signal component remaining in the digitized push-pull signal; and
generating the wobble signal by subtracting the residual RF signal component from the digitized push-pull signal,
wherein the step of generating the residual RF signal component generates the residual RF signal component so that it may approach the remaining RF signal component based on correlation between the wobble signal and the digitized RF signal.

8. The method for extracting a wobble signal according to claim 7,
wherein the step of generating the residual RF signal component includes a step of generating the residual RF proportional term such that a magnification of the proportional term signal is corrected based on correlation of the proportional term signal proportional to the digitized RF signal and the wobble signal, and
wherein the step of generating the wobble signal generates the wobble signal by subtracting the residual RF signal component including the residual RF proportional term from the digitized push-pull signal.

9. The method for extracting a wobble signal according to claim 8,
wherein the step of generating the residual RF signal component includes the steps of:
generating the residual RF differential term such that a magnification of a differential term signal proportional to a variation of the digitized RF signal is corrected based on correlation between the differential term signal and the wobble signal; and
generating the residual RF signal component by adding the residual RF proportional term and the residual RF differential term, and
wherein the step of generating the wobble signal generates the wobble signal by subtracting the residual RF signal component that includes the residual RF proportional term and the residual RF differential term from the digitized push-pull signal.

10. The method for extracting a wobble signal according to claim 8,
wherein the step of generating the residual RF proportional term includes a step of, when the magnitude of the RF signal component remaining in the wobble signal is larger than a predetermined value, adjusting gains of the first detection signal and the second detection signal.

11. The method for extracting a wobble signal according to claim 7, further comprising the steps of:
removing unnecessary frequency components from the digitized RF signal according to a band of the wobble signal; and
removing unnecessary frequency components from the digitized push-pull signal according to the band of the wobble signal.

* * * * *